US008884755B2

(12) United States Patent
Dworschak

(10) Patent No.: US 8,884,755 B2
(45) Date of Patent: Nov. 11, 2014

(54) PLUG-AND-PLAY RADIO MODULE FOR COMMUNICATING ON A SEPARATE RADIO CHANNEL

(75) Inventor: John R. Dworschak, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 255 days.

(21) Appl. No.: 13/251,719

(22) Filed: Oct. 3, 2011

(65) Prior Publication Data

US 2013/0082825 A1  Apr. 4, 2013

(51) Int. Cl.
| | | |
|---|---|---|
| H04W 4/20 | (2009.01) | |
| H04W 4/02 | (2009.01) | |
| H04M 1/725 | (2006.01) | |
| G06F 1/16 | (2006.01) | |
| H04M 3/42 | (2006.01) | |

(52) U.S. Cl.
CPC ............ *H04W 4/20* (2013.01); *H04M 1/72533* (2013.01); *H04M 1/72527* (2013.01); *G06F 1/1698* (2013.01); *H04W 4/02* (2013.01); *H04M 1/7253* (2013.01); *H04M 3/42357* (2013.01); *H04M 3/42348* (2013.01)
USPC ................... 340/539.13; 340/8.1; 342/357.22; 455/556.1; 455/556.2; 455/557; 701/517

(58) Field of Classification Search
CPC .......... H04M 1/72527; H04M 1/7253; H04M 1/72533; G06F 1/1698
USPC ........................... 340/8.1; 710/63; 342/357.22
See application file for complete search history.

(56) References Cited

U.S. PATENT DOCUMENTS

| | | | |
|---|---|---|---|
| 7,305,277 B2 | 12/2007 | Freeman et al. | |
| 7,720,505 B2 * | 5/2010 | Gopi et al. | ................. 455/552.1 |
| 8,514,069 B2 * | 8/2013 | Hadsall, Sr. | ............. 340/539.13 |
| 2002/0006800 A1 | 1/2002 | Mohi | |
| 2006/0173713 A1 * | 8/2006 | Petro et al. | ......................... 705/2 |
| 2006/0181411 A1 * | 8/2006 | Fast et al. | ................. 340/539.13 |
| 2008/0001734 A1 | 1/2008 | Stilp et al. | |
| 2010/0211708 A1 * | 8/2010 | Rohaly et al. | .................... 710/63 |
| 2011/0187527 A1 * | 8/2011 | Goodwill et al. | ......... 340/539.13 |
| 2012/0185606 A1 * | 7/2012 | Mocanu | ........................ 709/230 |

FOREIGN PATENT DOCUMENTS

| | | |
|---|---|---|
| DE | 20205360 U1 | 7/2002 |
| WO | WO2008085555 A3 | 7/2008 |
| WO | WO2009105721 A2 | 8/2009 |
| WO | WO2011100147 A1 | 8/2011 |

OTHER PUBLICATIONS

Combined Search and Examination Report, GB1217647.5, Jan. 28, 2013.
Combined Search and Examination Report, GB1217647.5, Oct. 15, 2013.

* cited by examiner

*Primary Examiner* — Daniel Wu
*Assistant Examiner* — Benyam Haile
(74) *Attorney, Agent, or Firm* — Ameh IP; Lowell Campbell; Elahe Toosi

(57) ABSTRACT

A system and methods for communicating with a location system are disclosed. An electronic communication device is provided to a user that performs a communication through a device specific communication channel. A separate radio communication channel that is different from the device specific communication channel is provided. Location information is received at the electronic communication device from a location system through the separate radio communication channel. The location information is viewed on the electronic communication device.

20 Claims, 4 Drawing Sheets

PLUG-AND-PLAY RADIO MODULE FOR COMMUNICATING ON A SEPARATE RADIO CHANNEL

FIELD

Embodiments of the present disclosure relate generally to communication systems. More particularly, embodiments of the present disclosure relate to wireless communication systems for location finding.

BACKGROUND

A real-time locating systems (RTLS) tracks and identifies a location of objects in real-time generally using simple inexpensive badges or tags coupled to the objects. Readers generally receive wireless signals from the badges or tags to determine a location of the objects. For example, a system may track vehicles within an area with tags mounted on vehicles to be identified and tracked within the area.

SUMMARY

A system and methods for communicating with a location system are disclosed. An electronic communication device is provided to a user that performs communication through a device-specific communication channel. A separate radio communication channel that is different from the device-specific communication channel is provided. Location information is received at the electronic communication device from a location system through the separate communication channel. The location information is viewed on the electronic communication device.

In this manner, embodiments of the disclosure provide a plug-and-play radio module for plugging into a portable communication device such as a smart phone to allow the smart phone to communicate with a real-time location system via a separate radio communication channel. The use of the separate radio communication channel provides an ability to include specific radio characteristics such as enhanced security and performance. Further, the smart phone using the separate radio communication channel does not utilize a cellular capability of the smart phone, which may be restricted or not available.

In an embodiment, a method for communicating with a location system provides an electronic communication device to a user operable to perform communication through a device-specific communication channel. The method further provides a separate radio communication channel that is different from the device-specific communication channel. The method further receives location information at the electronic communication device from a location system through the separate radio communication channel. The method further views the location information on the electronic communication device.

In another embodiment, a system for communicating to a location comprises a viewer system, a viewer system plug-and-play radio module, and a location system plug-and-play radio module. The viewer system is operable to perform communication through a device-specific communication channel. The viewer system plug-and-play radio module is operable to couple to the viewer system to provide a separate radio communication channel that is different from the device-specific communication channel. The location system plug-and-play radio module is operable to couple to the location system to receive location information from the location system, and transmit the location information through the separate radio communication channel to the viewer system plug-and-play radio module.

In yet another embodiment, a method for providing a plug-and-play communication system provides a first plug-and-play radio module coupled to a viewer system. The method further provides a second plug-and-play radio module coupled to a location system, and activates a separate radio communication channel between the first plug-and-play radio module and the second plug-and-play radio module.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
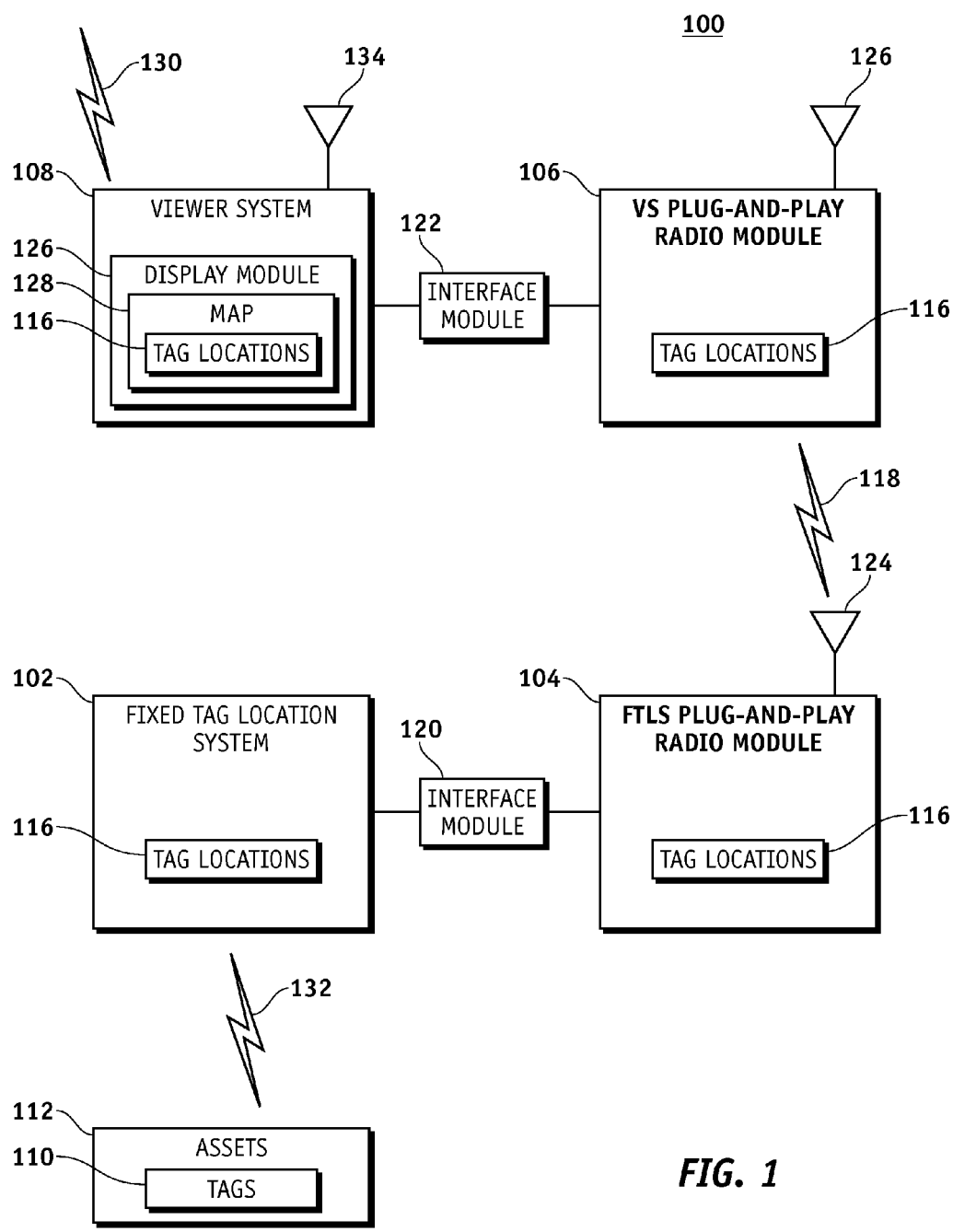
FIG. 1 is an illustration of an exemplary wireless communication system for transmitting and receiving location information according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to communication systems, network protocols, and other functional aspects of the systems (and the individual operating components of the systems) may not be described in detail herein.

Embodiments of the disclosure are described herein in the context of a practical non-limiting application, namely, a plug-and-play radio module for a mobile phone application. Embodiments of the disclosure, however, are not limited to such mobile phone applications, and the techniques described herein may also be utilized in other applications. For example, embodiments may be applicable to a desktop computer, a laptop or notebook computer, an iPod™, an iPod™, a mainframe, a server, a client, or any other type of special or general purpose computing device as may be desirable or appropriate for a given application or environment.

As would be apparent to one of ordinary skill in the art after reading this description, the following are examples and embodiments of the disclosure and are not limited to operating in accordance with these examples. Other embodiments may be utilized and changes may be made without departing from the scope of the exemplary embodiments of the present disclosure.

A portable electronic device such as a cell phone with a global position system (GPS) can provide an ability to track and locate itself, and may support many consumer applications. A location system generally makes data available on a hard-wire Ethernet network that may then be made available to a Wi-Fi™ network. When using a standard cellular communication channel for communicating location information, the cell phone must utilize its cellular bandwidth which may be restricted or not available when needed. When Wi-Fi™ or cellular is not readily-available, a medium other than Wi-Fi™ or cellular may be necessary or desirable to use.

Embodiments of the disclosure provide a plug-and-play radio module coupled to a portable electronic communication device such as a cell phone to provide a separate radio communication channel other than Wi-Fi™ or cellular channels for a user device to communicate with location systems. In this manner, a user can use the cell phone as a viewer system to view a location of an asset with a location tag. The location is provided by a tag location system using the separate radio communication channel other than, for example, Wi-Fi™ or Bluetooth™ that is usually available on the cell phone. The use of this separate radio communication channel provides an ability to include specific radio characteristics such as enhanced security and performance. Moreover, using the separate radio communication channel the cell phone does not utilize its cellular capability which may be restricted or not available.

FIG. 1 is an illustration of an exemplary wireless communication system 100 for transmitting and receiving location information according to an embodiment of the disclosure. A practical embodiment of the system 100 may comprises additional components and elements configured to support known or conventional operating features that need not be described in detail herein. In the exemplary embodiment, the system 100 can be used to transmit and receive location information in a wireless communication environment. The system 100 generally comprises a Fixed Tag Location System (FTLS) 102, a FTLS plug-and-play radio module 104, a viewer system (VS) plug-and-play radio module 106, a viewer system 108, and a separate radio communication channel 118.

The Fixed Tag Location System 102 is operable to receive tag locations 116 of the tags 110 coupled to the assets 112 via a communication channel 132. The tag locations 116 are available in a coordinate system of the Fixed Tag Location System 102, which may be, for example but without limitation, a job site or one or more GPS longitude and latitude coordinates such as a world geographical map, or other coordinate system. The viewer system 108 (e.g., a cell phone) is generally in proximity of the Fixed Tag Location System 102 depending on transmission power of transmitters at the viewer system 108 and the Fixed Tag Location System 102.

The Fixed Tag Location System 102 may comprise, for example but without limitation, a commercially available asset tracking system such as Zebra™, Ubisense™, AeroScout™, or any other asset tracking means to provide a user with a view of the tag locations 116 of the assets 112. In one embodiment, the Fixed Tag Location System 102 is coupled to the FTSL plug-and-play radio module 104 to transmit the tag locations 116 to the user using the separate radio communication channel 118.

The Fixed Tag Location System 102 provides information in near real-time or real-time about locations of the assets 112. The real-time information on the tag locations 116 of the assets 112 may be available with no latency. The near real-time information on the location of the asset may be available with a very short latency.

The assets 112 may comprise, for example but without limitation, a plant, an animal, a person, a vehicle, an object, a map location, a job site, a GPS longitude and latitude coordinates as a world geographical map, and/or any other type of assets 112 as may be desirable or appropriate for locating for a given application in a given environment. The tag locations 116 may obtain the locations of the assets 112 using the GPS longitude and latitude coordinates.

The Fixed Tag Location System 102 provides information on the tag locations 116 of the assets 112 in a form that can be used to relate them to their environment, for example but without limitation, as a symbol overlaid on a map or a floor plan, as an audible tone that indicates a proximity to one of the assets 112, and other methods that provide meaningful information to the user of the viewer system 108.

The FTLS plug-and-play radio module 104 is operable to couple to the Fixed Tag Location System 102 and provide the Fixed Tag Location System 102 with the separate radio communication channel 118 for communicating with the viewer system 108. The FTLS plug-and-play radio module 108 receives the tag locations 116 from the Fixed Tag Location System 102 and transmits the tag locations 116 to the VS plug-and-play radio module 106 via the separate radio communication channel 118. The FTLS plug-and-play radio module 106 may be coupled to the Fixed Tag Location System 102 via an interface module 120 such as a Universal Serial Bus (USB), or any other wired or wireless connector suitable for use with the Fixed Tag Location System 102.

The separate radio communication channel 118 may comprise a radio communication channel other than device specific communication channels that are usually available for communication with the viewer system 108. These other communication channels are usually predetermined communication channels and may comprise, the communication channels configured to support industry standards communication protocols, such as but without limitation, the Third Generation Partnership Project Long Term Evolution (3GPP LTE)™, Third Generation Partnership Project 2 Ultra Mobile Broadband (3Gpp2 UMB)™, Time Division-Synchronous Code Division Multiple Access (TD-SCDMA)™, and Wireless Interoperability for Microwave Access (WiMAX)™, and other usually used communication protocols. The other communication channels may also be configured to support alternate, or additional, wireless data communication protocols, including Wi-Fi™, Bluetooth™, and so on.

Thus, the separate radio communication channel 118 may comprise, frequency bands, such as but without limitation, an industrial scientific and medical (ISM) band, a V band, W band, ultra-wideband, and other frequency bands that are not usually available for communication with an electronic mobile communication device such as the viewer system 108. As mentioned above, the use of the separate radio communication channel 118 provides an ability to include specific radio characteristics such as enhanced security and performance.

The VS plug-and-play radio module 106 is operable to couple to the viewer system 108 and to transmit the location information received from the FTLS plug-and-play radio module 104 via the separate radio communication channel 118, to the viewer system 108. The viewer system plug-and-play radio module 106 may be coupled to the viewer system 108 via an interface module 122 such as a USB, or any other wired or wireless connector suitable for use with the viewer system 108.

The viewer system 108 is operable to receive the location of the tag from the VS plug-and-play radio module 106. The viewer system 108 may represent an electronic communication device, such as but without limitation, a mobile phone, a desktop computer, a laptop or notebook computer, an iPod™, an iPod™, Android™, a mainframe, a server, a client, or any other type of special or general purpose computing device as may be desirable or appropriate for a given application or environment. These electronic communication devices can be used as the viewer system 108 to view the tag locations 116 when the VS plug-and-play radio module 106 is coupled thereto.

The viewer system 108 is also configured to communicate to a base station transceiver (not shown) via a wireless data communication link 130. The VS transmitter module 204 and the VS receiver module 206 (FIG. 2) and the base station transceiver cooperate with a suitably configured RF antenna arrangement 134 that can support a particular wireless communication protocol and modulation scheme as mentioned above.

In operation, the VS plug-and-play radio module 106 and the FTLS plug-and-play radio module 104 are configured to communicate via the separate radio communication channel 118. The Fixed Tag Location System 102 is available and the radio modules established the separate communicate channel 118 between the Fixed Tag Location System 102 and the viewer system 108. In this manner, the VS plug-and-play radio module 106 and the FTLS plug-and-play radio module 104 cooperate with a suitably configured RF antenna arrangement 124/126 that can support the separate communicate channel 118 and associated modulation scheme.

As the assets 112 with a tags 110 moves (or stays stationary), the Fixed Tag Location System 102 determines location of the tag locations 116, and makes the tag locations 116 available to the VS plug-and-play radio module 106 via the FTLS plug-and-play radio module 104 through the separate radio communication channel 118. The tag locations 116 can then be shown on a display module 126 of the viewer system 108. For example, the tag locations 116 can be shown on a map 128 on the display module 126. The map 128 may be queried to the assets 112 mentioned above, to track, for example but without limitation, a particular individual, a vehicle or portable equipment.

In this manner, the VS plug-and-play radio module 106 or the FTLS plug-and-play radio module 104 described herein provide a readily-available mechanism for finding a location of the tag when it is necessary or desirable to use the separate radio communication channel 118. Thereby, the viewer system 108, does not utilize a usually-utilized communication channel that may be restricted or not available.

Figure 2:
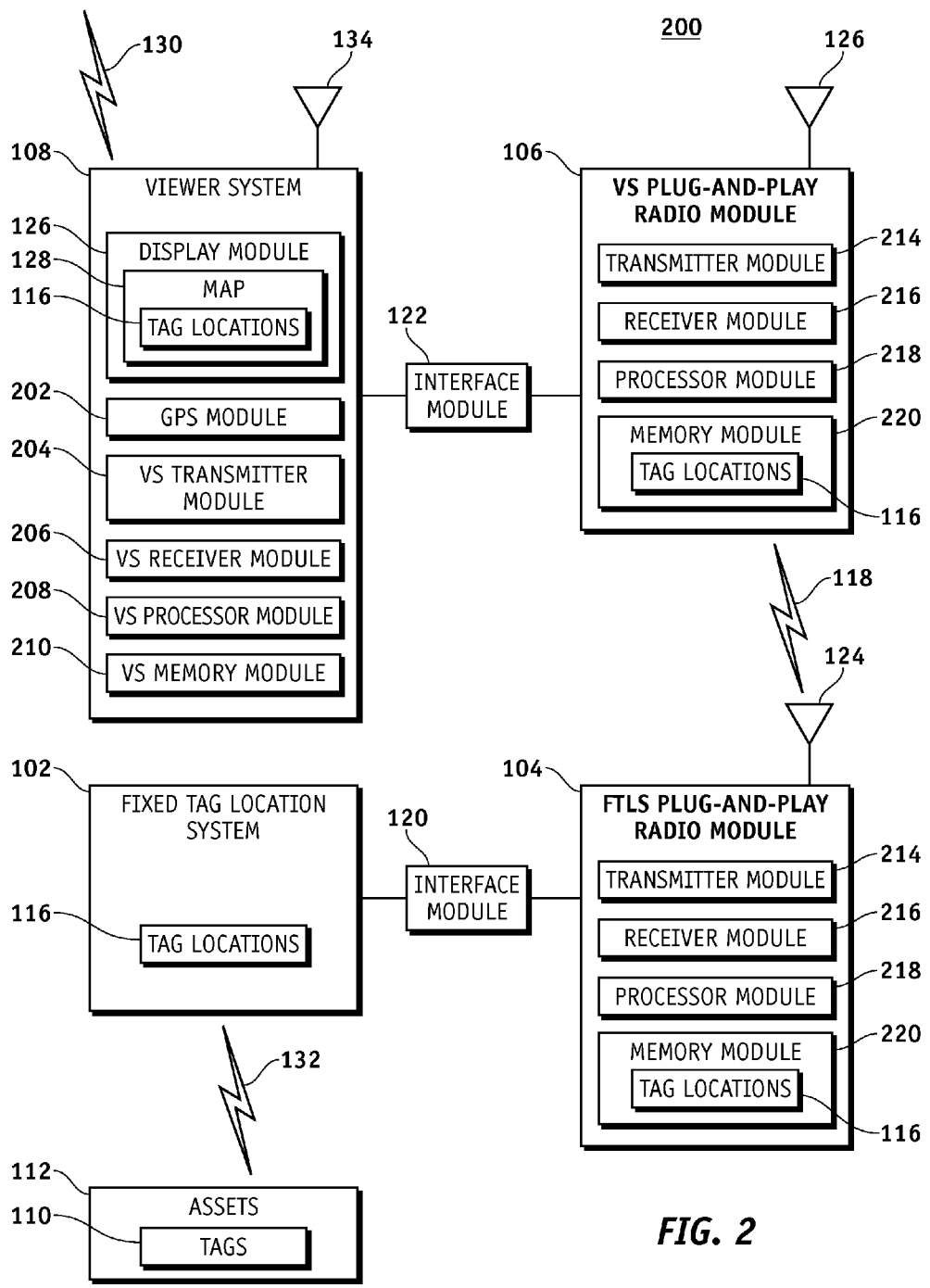
FIG. 2 is an illustration of a schematic functional block diagram of the system shown in FIG. 1.

FIG. 2 is an illustration of a schematic functional block diagram of the system 200 showing the system 100 in more detail according to an embodiment of the disclosure. The system 200 may have functions, material, and structures that are similar to the system 100. Therefore common features, functions, and elements may not be redundantly described here. The system 200 may comprise, the viewer system 108, the VS plug-and-play radio module 106, and the FTLS plug-and-play radio module 104, each of which generally comprise a physical housing (not shown).

The viewer system 108 may comprise the display module 126, a GPS module 202, a VS transmitter module 204, a VS receiver module 206, a VS processor module 208, and a VS memory module 210. A practical viewer system 108 may comprise any number of GPS modules, any number of processor modules, any number of memory modules, and any number of display modules. The illustrated viewer system 108 depicts a simple embodiment for ease of description. These and other elements of the viewer system 108 are interconnected together, allowing communication between the various elements of viewer system 108. In one embodiment, these and other elements of the viewer system 108 may be interconnected together via a VS data communication bus 212.

The display module 126 is constructed by using a display device, for example, a liquid crystal display panel, an organic electro-luminescence (EL) panel or any other a display device suitable for operation of the viewer system 108. The display module 126 displays an area corresponding to an image signal supplied from the VS processor module 208. The display module 126 is configured to display various information and images. For example, the tag locations 116 can be shown on the map 128 on the display module 126. As mentioned above, the map 128 may be queried to the assets 112, to track, for example but without limitation, a particular individual, a vehicle, a portable equipment, or any other assets whose location is provided to the viewer system 108 as explained above.

Each of the VS plug-and-play radio module 106 and the FTLS plug-and-play radio module 104 comprise a transmitter module 214, a receiver module 216, a processor module 218, and a memory module 220. A practical VS plug-and-play radio module 106 and a practical FTLS plug-and-play radio module 104 (collectively may be called a plug-and-play radio module hereinafter) each may comprise any number of transmitter modules, any number of receiver modules, any number of processor modules, and any number of memory modules, and number other modules suitable for their operation described herein.

The illustrated plug-and-play radio modules 104/106 depict a simple embodiment for ease of description. These and other elements of the VS plug-and-play radio module 104 and the FTLS plug-and-play radio module 104 are interconnected together, allowing communication between the various elements of each plug-and-play radio modules 104/106. In one embodiment, these and other elements of the plug-and-play radio modules 104/106 may be interconnected together via a data communication bus 222.

The VS transmitter module 204 and the VS receiver module 206 are coupled to a shared antenna 224. The transmitter module 214 and the receiver module 216 of the plug-and-play radio modules 104/106 are coupled to their respective shared antenna 226. Although in a simple plug-and-play radio module 104/106 only one shared antenna 226 is required, more sophisticated plug-and-play radio modules may be provided with multiple and/or more complex antenna configurations. Additionally, although not shown in this FIG. 2, those skilled in the art will recognize that a transmitter may transmit to more than one receiver, and that multiple transmitters may transmit to the same receiver.

The VS plug-and-play radio modules 106, receives the tag locations 116 of the assets 112 from the Fixed Tag Location System 102 via the separate radio communication channels 118 and transmits the tag locations 116 to the viewer system 108 through the interface module 122. The viewer system 108 receives the tag locations 116 through the interface module 122 at the VS receiver module 206.

Processor modules 208/218 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices, e.g., a combination of a digital signal processor and a microprocessor, a plurality of microprocessors, one or more microprocessors in conjunction with a digital signal processor core, or any other such configuration. In practice, processor modules 208/218 comprise processing logic that is configured to carry out the functions, techniques, and processing tasks associated with the operation of the systems 100-200.

In particular, the processing logic is configured to support the asset tracking method described herein. For, example the processor modules 218 may be suitably configured to send the tag locations 116 from the transmitter module 214 of the FTLS plug-and-play radio module 104 to the receiver module 216 of the VS plug-and-play radio module 106. Furthermore, the steps of a method or algorithm described in connection with the embodiments disclosed herein may be embodied directly in hardware, in firmware, in a software module executed by processor modules 208/218, or in any practical combination thereof.

The memory modules 210/220, may be realized as a non-volatile storage device (non-volatile semiconductor memory, hard disk device, optical disk device, and the like), a random access storage device (for example, SRAM, DRAM), or any other form of storage medium known in the art. The memory modules 210/220 may be coupled to the processor modules 208/218 respectively such that the processor modules 208/218 can read information from, and write information to, memory modules 210/220.

As an example, the processor module 208 and memory modules 210, the processor module 218 and the memory module 220 may reside in their respective ASICs. The memory modules 210/220 may also be integrated into the processor modules 208/218 respectively. In an embodiment, the memory module 210/220 may include a cache memory for storing temporary variables or other intermediate information during execution of instructions to be executed by processor modules 208/218. The memory modules 210/220 may also include non-volatile memory for storing instructions to be executed by the processor modules 208/218.

The memory modules 210/220 may include a location database (not shown) for storing the tag locations 116 in accordance with an embodiment of the disclosure. The location database may be configured to store, maintain, and provide data as needed to support the functionality of system 200 in the manner described below. Moreover, the location database may be a local database coupled to each of the processor modules 208/218 respectively, or may be a remote database, for example, a central network database, and the like. The location database may include a lookup table for purposes of storing the tag locations 116. Each of the memory modules 210/220 may also store, a computer program that is executed by the processor module 208/218 respectively, an operating system, an application program, tentative data used in executing a program processing, and the like.

Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

Figure 3:
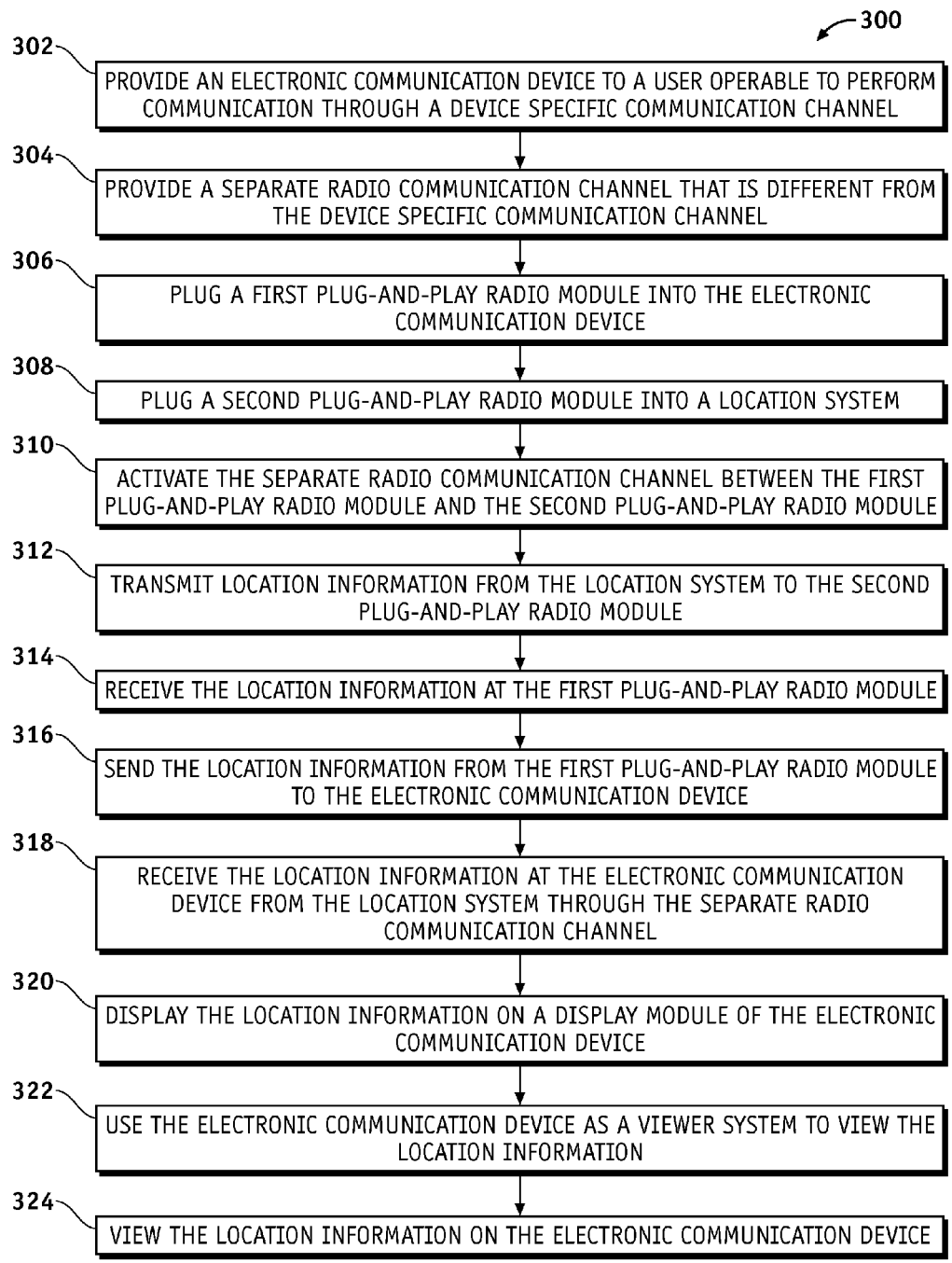
FIG. 3 is an illustration of an exemplary flowchart showing a process for tracking an asset according to an embodiment of the disclosure.

FIG. 3 is an illustration of an exemplary flowchart showing a process 300 for tracking an asset according to an embodiment of the disclosure. The various tasks performed in connection with the process 300 may be performed by software, hardware, firmware, a computer-readable medium having computer executable instructions for performing the process method, or any combination thereof. The process 300 may be recorded in a computer-readable medium such as a semiconductor memory, a magnetic disk, an optical disk, and the like, and can be accessed and executed, for example, by a computer CPU such as the processor modules 208/218 in which the computer-readable medium is stored.

It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein. In practical embodiments, portions of the process 300 may be performed by different elements of the systems 100-200 such as: the Fixed Tag Location System (FTLS) 102, the FTLS plug-and-play radio module 104, the viewer system plug-and-play radio module 106, the viewer system 108, and the separate radio communication channel 118. Process 300 may have functions, material, and structures that are similar to the embodiments shown in FIGS. 1-2. Therefore common features, functions, and elements may not be redundantly described here.

Process 300 may begin by providing an electronic communication device such as the viewer system 108 to a user operable to perform communication through a device specific communication channel (task 302).

Process 300 may then continue by providing the separate radio communication channel 118 that is different from the device specific communication channel (task 304).

Process 300 may then continue by plugging a first plug-and-play radio module such as the VS plug-and-play radio module 106 into the electronic communication device (task 306).

Process 300 may then continue by plugging a second plug-and-play radio module such as the FTLS plug-and-play radio module 104 into the location system (task 308).

Process 300 may then continue by activating the separate radio communication channel 118 between the first plug-and-play radio module and the second plug-and-play radio module (task 310).

Process 300 may then continue by transmitting the location information from the location system to the second plug-and-play radio module (task 312).

Process 300 may then continue by receiving the location information at the first plug-and-play radio module (task 314).

Process 300 may then continue by sending the location information from the first plug-and-play radio module to the electronic communication device (task 316).

Process 300 may then continue by receiving location information at the electronic communication device from a location system such as the 104 Fixed Tag Location System 102 through the separate radio communication channel 118 (task 318).

Process 300 may then continue by displaying the location information on a display module such as the display module 126 of the electronic communication device (task 320).

Process 300 may then continue by using the electronic communication device as viewer system to view the location information (task 322).

Process 300 may then continue by viewing the location information on the electronic communication device (task 324).

Figure 4:
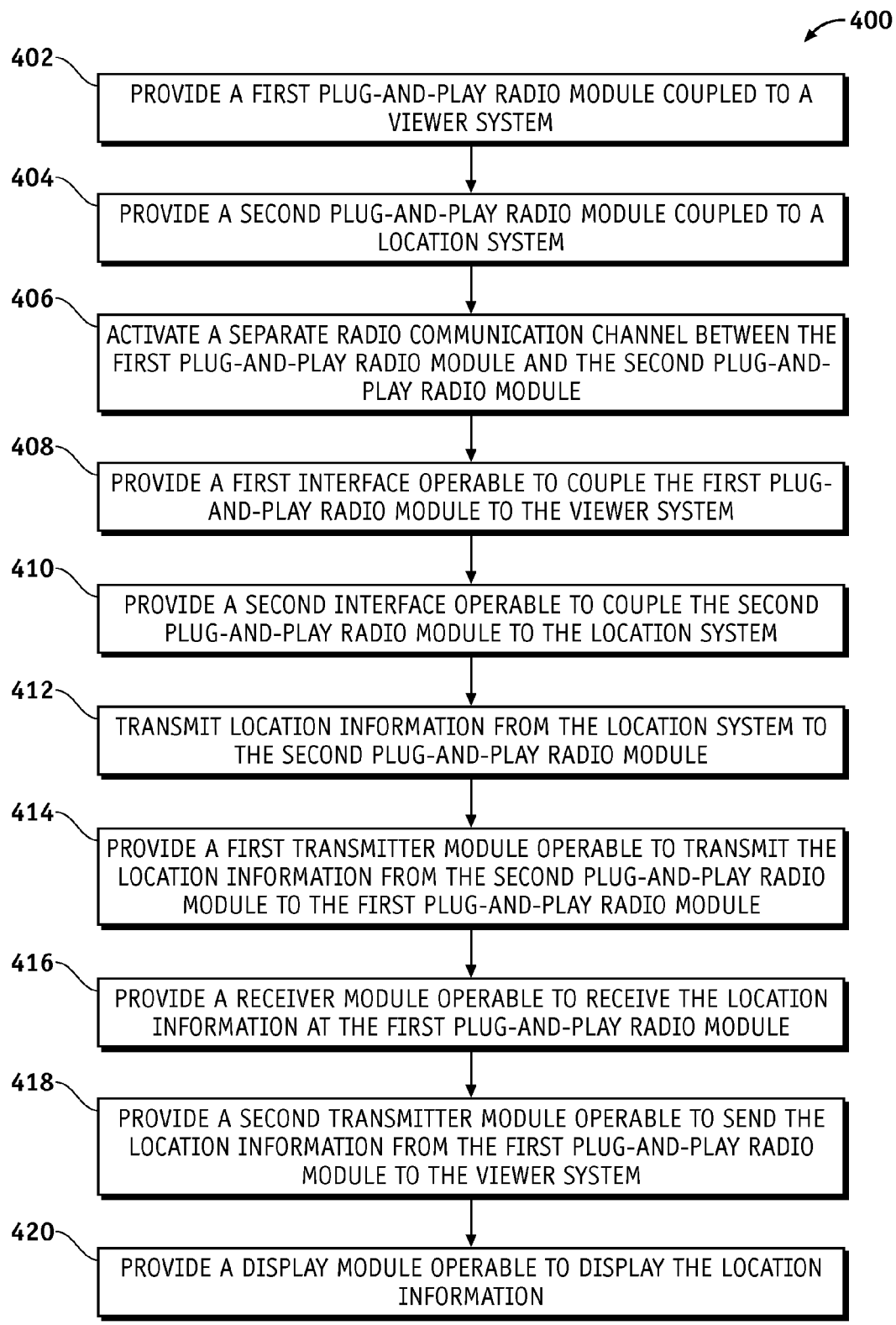
FIG. 4 is an illustration of an exemplary flowchart showing a process for providing a plug-and-play radio module according to an embodiment of the disclosure.

FIG. 4 is an illustration of an exemplary flowchart showing a process 400 for providing a plug-and-play radio module according to an embodiment of the disclosure. The various tasks performed in connection with the process 400 may be performed by software, hardware, firmware, a computer-readable medium having computer executable instructions for performing the process method, or any combination thereof. The process 400 may be recorded in a computer-readable medium such as a semiconductor memory, a magnetic disk, an optical disk, and the like, and can be accessed and executed, for example, by a computer CPU such as the processor modules 218/208 in which the computer-readable medium is stored.

It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. In practical embodiments, portions of the process 400 may be performed by different elements of the systems 100-200 such as the Fixed Tag Location System (FTLS) 102, the FTLS plug-and-play radio module 104, the viewer system plug-and-play radio module 106, the viewer system 108, and the separate radio communication channel 118. Process 400 may have functions, material, and structures that are similar to the embodiments shown in FIGS. 1-2. Therefore common features, functions, and elements may not be redundantly described here.

Process 400 may begin by providing a first plug-and-play radio module such as the VS plug-and-play radio module 106 coupled to a viewer system (task 402).

Process 400 may then continue by providing a second plug-and-play radio module such as the FTLS plug-and-play radio module 104 coupled to a location system such as the Fixed Tag Location System 102 (task 404).

Process 400 may then continue by activating a separate radio communication channel such as the separate radio communication channel 118 between the first plug-and-play radio module and the second plug-and-play radio module (task 406).

Process 400 may then continue by providing a first interface such as the interface module 122 operable to couple the first plug-and-play radio module to the viewer system (task 408).

Process 400 may then continue by providing a second interface such as the interface module 120 operable to couple the second plug-and-play radio module to the location system (task 410).

Process 400 may then continue by transmitting location information from the location system to the second plug-and-play radio module (task 412).

Process 400 may then continue by providing a first transmitter module such as the transmitter module 214 operable to transmit the location information from the second plug-and-play radio module to the first plug-and-play radio module (task 414).

Process 400 may then continue by providing a receiver module such as the receiver module 216 operable to receive the location information at the first plug-and-play radio module (task 416).

Process 400 may then continue by providing a second transmitter module such as the transmitter module 214 operable to send the location information from the first plug-and-play radio module to the viewer system (task 418).

Process 400 may then continue by providing a display module operable to display the location information (task 420).

In this manner, embodiments of the disclosure provide a plug-and-play radio module allowing a portable communication device to communicate with a real-time location system (RTLS) via a separate radio communication channel.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according the embodiments of the present disclosure.

The term real-time refers to a signal that is continuously being sent and received, with little or no time delay. The term near-real-time refers to a real-time signal with substantially no significant time delay. The time delay may be a delay introduced by, for example but without limitation, automated data processing or network transmission, between occurrence of an event, and the like. In this document, the term real-time refers to both real-time and near-real-time.

In this document, the terms "computer program product", "computer-readable medium", and the like may be used generally to refer to media such as, for example, memory, storage devices, or storage unit. These and other forms of computer-readable media may be involved in storing one or more instructions for use by the processor modules 208/218 to cause the processor modules 208/218 to perform specified operations. Such instructions, generally referred to as "computer program code" or "program code" (which may be grouped in the form of computer programs or other groupings), when executed, enable a method of using a system.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-2 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for communicating with a location system, the method comprising:
   providing an electronic communication device to a user operable to perform wireless communication through a device specific communication channel;
   providing a separate radio communication channel that is different from the device specific communication channel via a first plug-and-play radio module mechanically coupled to the electronic communication device, the separate radio communication channel comprising short and long radio communication ranges, and excluded from using other than industry standard communication protocols, in an unlicensed wireless communication frequency band not utilized by the device specific communication channel;
   receiving location information of a plurality of tagged assets at the electronic communication device via the first plug-and-play radio module directly from a location system through the separate radio communication channel via a second plug-and-play radio module mechanically coupled directly to the location system, the location system operable to track the location information of the tagged assets, and the location information transmitted to the first plug-and-play radio module from the second plug-and-play radio module adopting a same communication protocol; and
   viewing the location information of the tagged assets on the electronic communication device.

2. The method of claim 1, wherein the device specific communication channel is configured to support at least one member selected from the group consisting of: an industry standard communication protocol, Wi-Fi TM, and Bluetooth TM.

3. The method of claim 1, wherein the step of receiving further comprises:
   plugging the first plug-and-play radio module into the electronic communication device;
   plugging the second plug-and-play radio module into the location system;
   activating the separate radio communication channel between the first plug-and-play radio module and the second plug-and-play radio module;
   transmitting the location information from the location system to the second plug-and-play radio module;
   receiving the location information at the first plug-and-play radio module; and
   sending the location information from the first plug-and-play radio module to the electronic communication device.

4. The method of claim 1, wherein the step of viewing further comprises displaying the location information on a display module of the electronic communication device.

5. The method of claim 1, further comprising using the electronic communication device as a viewer system to view the location information.

6. The method of claim 1, wherein the location information comprises at least one tag location.

7. A system for communicating to a location system, comprising:
   a viewer system operable to perform wireless communication through a device specific communication channel;
   a viewer system plug-and-play radio module operable to mechanically couple directly to the viewer system to provide a separate radio communication channel that is different from the device specific communication channel, the separate radio communication channel comprising short and long radio communication ranges, and excluded from using other than industry standard communication protocols in an unlicensed wireless communication frequency band not utilized by the device specific communication channel;

and a location system plug-and-play radio module operable to:
couple mechanically to the location system to receive location information of a plurality of tagged assets from the location system, the location system operable to track the location information of the tagged assets; and
transmit the location information of the tagged assets through the separate radio communication channel to the viewer system plug-and-play radio module, the location information transmitted to the viewer system plug-and-play radio module from the location system plug-and-play radio module adopting a same communication protocol.

8. The system of claim 7, wherein the plug-and-play radio module is further operable to transmit the location information to the viewer system.

9. The system of claim 7, further comprising a display module operable to display the location information.

10. The system of claim 7, wherein the location information comprises at least one tag location.

11. The system of claim 7, wherein the viewer system and the location system plug-and-play radio module each comprise: a transmitter operable to transmit the location information; a receiver operable to receive the location information; and a memory module operable to store the location information.

12. The system of claim 7, wherein the location system plug-and-play radio module is operable to couple to the location system via a first interface.

13. The system of claim 7, wherein the viewer system plug-and-play radio module is operable to couple to the location system via a second interface.

14. A method for providing a plug-and-play communication system, the method comprising:
a viewer system operable to perform wireless communication;
providing a first plug-and-play radio module mechanically coupled to the viewer system; providing a second plug-and-play radio module mechanically coupled directly to a location system, the location system operable to track location information of a plurality of tagged assets comprising location tags; and
activating a separate radio communication channel between the first plug-and- play radio module and the second plug-and-play radio module, the separate radio communication channel comprising short and long radio communication ranges. excluded from using other than industry standard communication protocols in an unlicensed wireless communication frequency band not utilized by the viewer system, and the location information transmitted to the first plug- and-play radio module from the second plug-and-play radio module adopts a same communication protocol.

15. The method of claim 14, wherein the separate radio communication channel is different from predetermined communication channels allocated for the viewer system to enhance security.

16. The method of claim 15, wherein the predetermined communication channels are configured to support at least one member selected from the group consisting of: an industry standards communication protocol, Wi-Fi™, and Bluetooth™.

17. The method of claim 15, further comprising providing a first interface operable to couple the first plug-and-play radio module to the viewer system.

18. The method of claim 15, further comprising providing a second interface operable to couple the second plug-and-play radio module to the location system.

19. The method of claim 14, further comprising:
transmitting the location information from the location system to the second plug-and-play radio module;
providing a first transmitter module operable to transmit the location information from the second plug-and-play radio module to the first plug-and-play radio module;
providing a receiver operable to receive the location information at the first plug-and-play radio module;
providing a second transmitter operable to send the location information from the first plug-and-play radio module to the viewer system; and
providing a display module operable to display the location information.

20. The method of claim 14, wherein the viewer system comprises a cellular communication device.

* * * * *